United States Patent
Subramanian et al.

(10) Patent No.: US 11,882,444 B1
(45) Date of Patent: *Jan. 23, 2024

(54) LOCATION BASED TWO-FACTOR AUTHENTICATION DELIVERY TOKEN

(71) Applicant: ROAMBEE Corporation, Santa Clara, CA (US)

(72) Inventors: Vidya Subramanian, Santa Clara, CA (US); Sanjay Sharma, Santa Clara, CA (US)

(73) Assignee: ROAMBEE Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,746

(22) Filed: Mar. 15, 2022

Related U.S. Application Data

(63) Continuation of application No. 16/266,022, filed on Feb. 2, 2019, now Pat. No. 11,277,740.

(51) Int. Cl.
*H04W 12/06* (2021.01)
*H04L 9/40* (2022.01)
*H04W 12/63* (2021.01)

(52) U.S. Cl.
CPC ........... *H04W 12/06* (2013.01); *H04L 63/083* (2013.01); *H04L 63/0853* (2013.01); *H04L 63/0861* (2013.01); *H04W 12/63* (2021.01)

(58) Field of Classification Search
None
See application file for complete search history.

(56) References Cited

U.S. PATENT DOCUMENTS

| 9,699,606 | B1 | 7/2017 | Bhatia et al. | |
| 2015/0262123 | A1 | 9/2015 | Sharma et al. | |
| 2017/0091699 | A1* | 3/2017 | Mueller | H04W 4/023 |
| 2019/0130348 | A1 | 5/2019 | Mellado et al. | |
| 2019/0174316 | A1 | 6/2019 | Diem | |

\* cited by examiner

*Primary Examiner* — Brandon Hoffman

(57) ABSTRACT

A method, including, associating a wireless tracker with an asset, tracking a location of the asset via the wireless tracker, determining a recipient mobile device authorized to accept receipt of the asset, determining a recipient mobile device holder is authorized to accept receipt of the asset, determining if the location of the asset is within a defined delivery location, determining if the authorized recipient mobile device is within the defined delivery location, sending a passcode to the authorized recipient mobile device if the authorized recipient mobile device location and the location of the asset are within the defined delivery location, receiving an authenticated passcode from the authorized recipient mobile device within the defined delivery location and notifying a delivery agent that delivery of the asset is approved.

20 Claims, 8 Drawing Sheets

US 11,882,444 B1

LOCATION BASED TWO-FACTOR AUTHENTICATION DELIVERY TOKEN

TECHNICAL FIELD OF THE APPLICATION

This application relates to security of package deliver, more specifically, to two-factor authentication tokens associated with delivery of a package at a location to an authorized recipient.

BACKGROUND OF THE APPLICATION

Conventional package delivery is to an individual at a delivery location that receives a package. Proving delivery is often a matter of finding a signature at the date and time of delivery.

Conventional package delivery confirmation does not provide that a specific recipient must be at a specific location along with the location tracked asset. Additionally, current package delivery does not require that the delivery person receive an authorization to hand the package to the recipient. High value documents and objects such as pharmaceuticals are at risk currently due to this lack of confirmation of asset and recipient co-location and asset delivery authorization.

Accordingly, there is a need for systems, methods, and devices for improved techniques to insure that an asset and an authorized recipient are co-located and that delivery of the asset is authorized to a verified recipient.

SUMMARY OF THE APPLICATION

A first example embodiment of the present application provide at least a method, including, associating a wireless tracker with an asset, tracking a location of the asset via the wireless tracker, determining a recipient mobile device authorized to accept receipt of the asset, determining a recipient mobile device holder is authorized to accept receipt of the asset, determining if the location of the asset is within a defined delivery location, determining if the authorized recipient mobile device is within the defined delivery location, sending a passcode to the authorized recipient mobile device if the authorized recipient mobile device location and the location of the asset are within the defined delivery location, receiving an authenticated passcode from the authorized recipient mobile device within the defined delivery location and notifying a delivery agent that delivery of the asset is approved.

A second example embodiment of the present application provide at least a system, including a wireless tracker affixed to an asset, wherein the wireless tracker transmits a location of the wireless tracker and a cloud based system having a non-transitory computer readable medium, comprising instructions that when read by a processor, cause the processor to; associate the wireless tracker with the asset, track the location of the asset via the wireless tracker, determine a recipient mobile device authorized to accept receipt of the asset, determine a recipient mobile device holder is authorized to accept receipt of the asset, determine if the location of the asset is within a defined delivery location, determine if an authorized recipient mobile device location is within the defined delivery location, send a passcode to the authorized recipient mobile device if the authorized recipient mobile device location and the location of the asset are within the defined delivery location, receive an authenticated passcode from the authorized recipient mobile device within the defined delivery location and notify a delivery agent that delivery of the asset is approved.

A third example embodiment of the present application provide at least a non-transitory computer readable medium comprising instructions that, when read by a processor, cause the processor to perform associating a wireless tracker with an asset, tracking a location of the asset via the wireless tracker, determining a recipient mobile device authorized to accept receipt of the asset, determining that a recipient mobile device holder is authorized to accept receipt of the asset, determining if the location of the asset is within a defined delivery location, determining if the authorized recipient mobile device is within the defined delivery location, sending a passcode to the authorized recipient mobile device if the authorized recipient mobile device location and the location of the asset are within the defined delivery location, receiving an authenticated passcode from the authorized recipient mobile device within the defined delivery location and notifying a delivery agent that delivery of the asset is approved.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
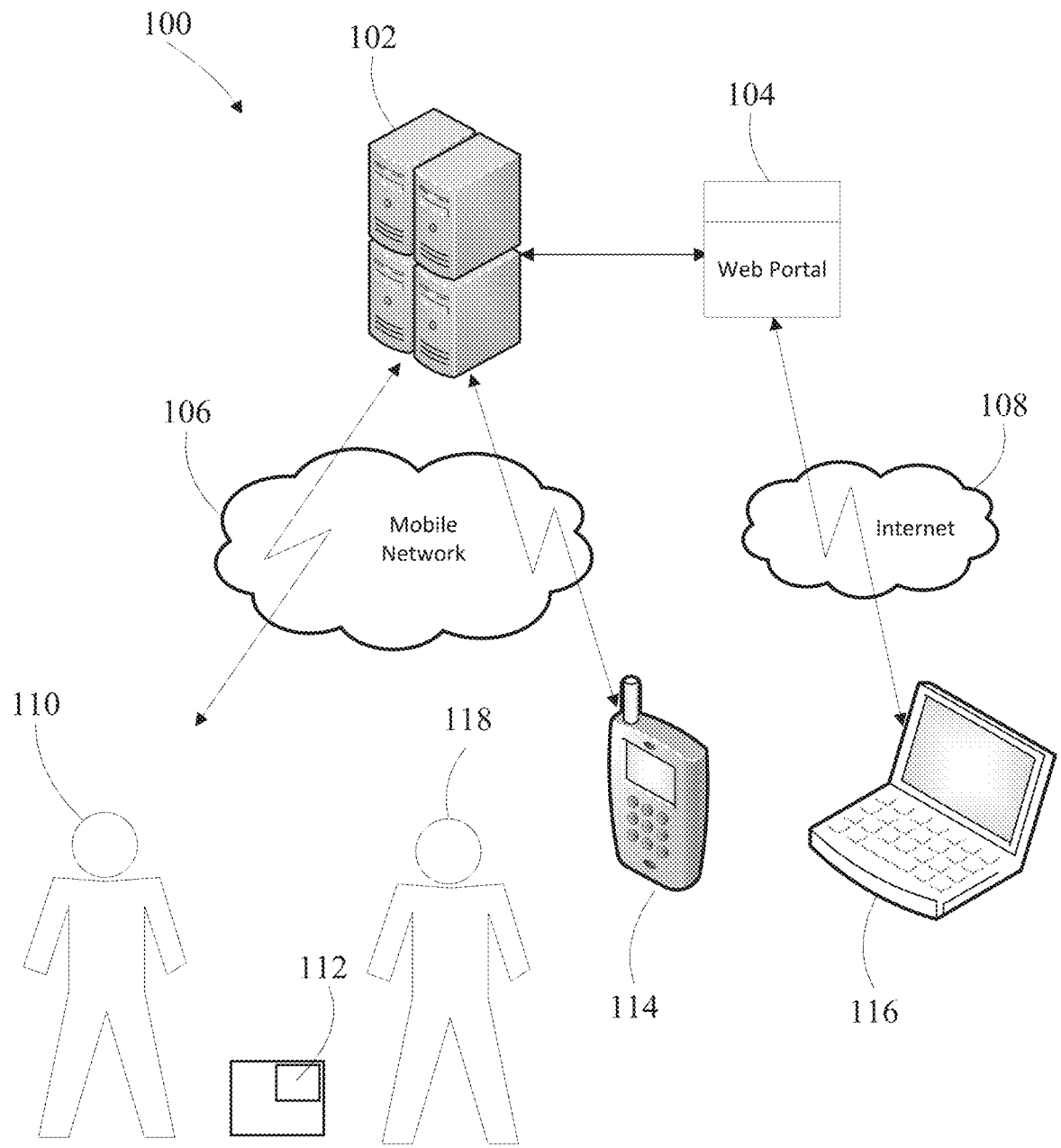
FIG. 1 is a functional block diagram of a system for location based two-factor authentication delivery token, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE APPLICATION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms. Embodiments of the present disclosure include systems, methods, and devices for triggering a token to be sent to an authorized recipient of a shipped asset for receipt verification. The token may only be triggered when the wireless tracker is at the designated destination. This gives customers an accurate proof of delivery that ties both location and recipient to the shipment. The token will only be sent to the authorized recipient.

Electronic proof of delivery (EPOD) may enable the ability to securely ship items that were in the past not possible. Pharma Class A drugs require a stringent chain of custody including information that it was provided to the right patient. EPOD extends to assets that are securely delivered from currency to food.

The ability to use multiple means to show that the proof of delivery is authentic may drive its adoption by regulated deliveries.

The proposed solution to identify the location, person receiving the package and the asset condition will together will make the proof of delivery complete.

A video of the location with the receiver and the asset may allow the required pieces of information to be stitched together. Video of the location which then compares this to previously scanned location information to determine location. Visual recognition using a reverse image search of a location other than GPS may be useful for indoor deliveries where GPS does not function. If GPS is useable, then the photos may be geotagged to determine location.

The ability to confirm that the recipient is authentic becomes critical to prove the chain of custody. Recipient authentication may be performed through the use of of biometrics such as a retina scan, iris scan, finger print, vein recognition, facial recognition and the like.

Location and recipient identification may also be performed by utilizing video and or applications on the mobile phone that determine both location identification and provide recipient authentication by means of facial scan, iris scan or the like.

The current disclosure shows a system that allows two factor authentication by tracking the locations of an asset to be delivered via a wireless tracker and an authorized recipient by way of location of his cell phone. Only if both the asset to be delivered and the recipients authorized mobile device are within the delivery area, and a timely returned passcode confirmation are received is the delivery authorized.

The overall components of the system include a cloud server, a wireless tracker which may be a Bluetooth low energy (BLE) ranging device and a mobile device having a wireless tracker application.

The mobile application may run on a smartphone in the background and listens to BLE transmissions.

One example process includes, a wireless tracker affixed to an asset that is being delivered, where the wireless tracker transmits its location the server through the wireless tracker or the mobile application. The server has defined locations where assets may be delivered and the server checks the location of assets with its expected delivery location after every transmission of location of the wireless tracker. If the server detects that the location of the asset is at the defined destination, then it sends a passcode to a designated recipient mobile phone. At that point, the recipient enters the code into the mobile application which sends the code and the location of the application back to the server. The server verifies whether the location of the asset and the location of the mobile application that entered the passcode are the same, notifies the delivery agent through the mobile application that the delivery is authorized and saves the delivery information including the passcode confirmation to show proof of delivery.

The assets may be delivered to a location, and both the recipient and the location are authenticated before delivery. This provides multiple levels of security to ensure correct delivery including address and recipient confirmation.

Software is assigned to a user and which creates an authentication code at fixed intervals using a built-in clock and a random key which is different for each token and is loaded into the server.

FIG. 1 is a functional block diagram of a system 100 for tracking a shipment using a wireless tracker, in accordance with some embodiments. Such a system 100 includes one or more computer servers 102 that may host a web portal 104 or other user portal. A user device (114-116) such as a smartphone, tablet computer, laptop computer, and desktop computer may access the web portal 104 over the Internet 108. Alternatively, a user device 114 may access the computer server(s) 102 across a mobile network 106. In addition, a delivery agent 110 delivers a package containing the wireless tracker 112 to an authorized recipient 118. The authorized wireless device 114/116 is in communication with the computer server(s) 102 over the mobile network 106. Such a system may be used by a shipping delivery company or a company that frequently ships various assets among the company's facilities that are separated by geographic distances.

In one embodiment a wireless tracker 112 is affixed to an asset, wherein the wireless tracker transmits a location of the wireless tracker. A cloud based system has a processor that associates the wireless tracker with the asset and tracks the location of the asset via the wireless tracker through a mobile network 106 either directly or through a mobile device 114/116. The processor determines a recipient mobile device authorized to accept receipt of the asset, determines if the location of the asset is within a defined delivery location and determines if an authorized recipient mobile device location is within the defined delivery location. The processor through the mobile network 106 or the internet 108 sends a passcode to the authorized recipient mobile device if the authorized recipient mobile device location and the location of the asset are within the defined delivery location. The processor receives an authenticated passcode from the authorized recipient mobile device within the defined delivery location and notifies a delivery agent 110 that delivery of the asset is approved.

In one embodiment, the wireless tracker 112 may determine its location using a global positioning system (GPS) device or communicating with one or more GPS devices over a network. Further, the wireless tracker may include a battery such that the wireless tracker 112 regulates battery usage based on the location of the wireless tracker 112. For example, when within a distance threshold of the shipment origin or shipment destination, the management module may request the communication module to determine a location of the wireless tracker 112 and ranging data at frequent intervals so as to provide frequent updates to a shipper on the location status of the shipment. However, beyond a distance threshold of the shipment origin and prior to a distance threshold of a shipment destination, frequent location status updates may not be needed by the shipper. Thus, the management module may not request the communication module to determine the location of the wireless tracker as frequently thereby regulating battery usage of the communication module. The location of the wireless tracker 112 may be forwarded to the computer server(s) 102 from the wireless tracker 112. Further, the computer server(s) may forward the location of the wireless tracker 112 to user devices (114-116).

In another embodiment, the wireless tracker 112 may include one or more sensors that are configurable. Further, the wireless tracker 112 may access the receive sensor information which is passed on to the server. In addition, the wireless tracker 112 may determine a trigger event based on the location of the wireless tracker 112 or sensor information such as deceleration or movement of the truck door. In addition, the wireless tracker 112 may send or transmit a notification to the computer server 102 based on the trigger event. Further, the computer server(s) may forward the notification to user devices (114-116).

In additional embodiments, the wireless 112 tracker is configured to receive and verify one or more codes to for a chain of custody of the shipment. In one embodiment, the wireless tracker receives a code at a shipment origin and receives a code at a shipment destination. Based on such authentication, the wireless tracker may transmit a notification to the computer server(s) 102 verifying chain of custody.

Figure 2:
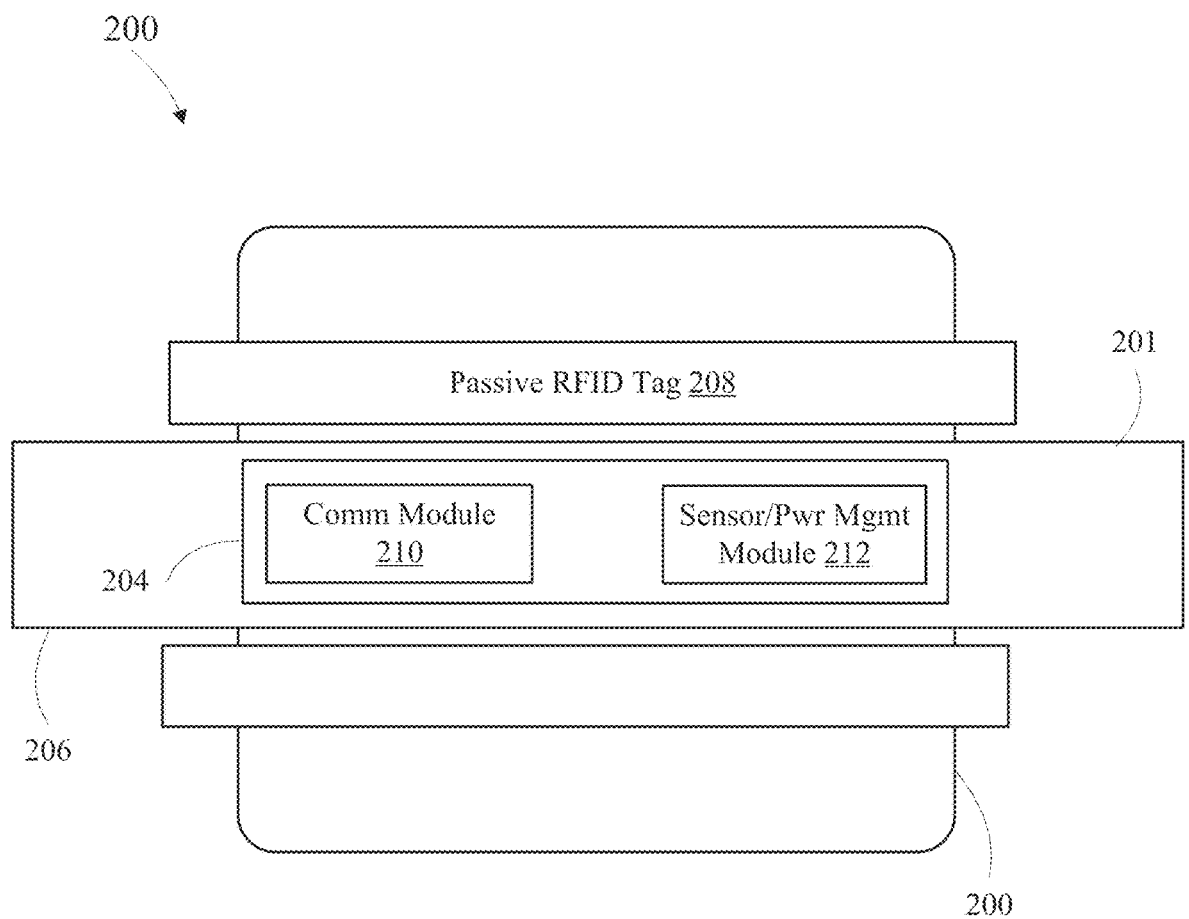
FIGS. 2-3 are functional block diagrams of a wireless tracker, in accordance with some embodiments.

FIG. 2 is a functional block diagram of a wireless tracker 200, in accordance with some embodiments. The wireless tracker 200 includes communication module 210 and authentication module 204 that is a bolted onto an integrated circuit board. A passive radio frequency identification (RFID) tag 208 is affixed to the truck door and programmed to have a unique identity/identification.

The wireless tracker 200 may be manufactured and operated in part by a third party manufacturer that may be used by a shipper or shipment delivery company. The third party manufacturer may own or operate one or more computer servers to communicate with the wireless tracker 200 over one or more wireless communication networks using the communication module 210. Further, the communication module 210 may be include one or communication interfaces configured to communicate over various wireless networks such as GPS, Zigbee, Zwave, WiFi, cellular/mobile, Bluetooth, WiMAX or any other wireless communication network. In addition, the communication module may have an interface to communicate with other devices over a wired network or a wired interface such as an Ethernet cable or USC interface. Such wired connections may be implemented when first configuring the wireless tracker 200 by the third party manufacturer prior to use.

In some embodiments, the communication module 210 is configured to determine a current location of the wireless tracker device at one or more intervals wherein the one or more intervals are based on a delivery route of the shipment. For example, the communication module 210 may be configured (by the management module 212) to determine the location of the wireless tracker frequently within a distance threshold of the shipment origin or shipment destination. However, the communication module 210 may be configured to determine the location of the wireless tracker not as frequently beyond the distance threshold of the shipment origin and prior to the distance threshold of the shipment destination. Although such a configuration manages battery life, such a configuration also avoids a situation when a user defines an alert condition when an asset enters and exits a specified geographic boundary that may not have been provided if the update interval was simply 30 minutes. In such a scenario, if the asset enters and exits the specified geographic boundary within 30 minutes then the tracing device fails to provide an update.

In an alternative embodiment, the management module 212 may receive sensor information from one or more sensors of the wireless tracker 200 at different time intervals. However, the management module may request sensor information for specific sensors only after the wireless tracker has moved to a different location thereby regulating battery life. The management module 212 may be configured to receive sensor information when the wireless tracker has moved to a new location instead of at certain time intervals (e.g. every 30 minutes). Thus, the wireless tracker may stay at a certain location for a period of time (e.g. longer than 30 minutes) and the management module regulates battery usage/life by only gathering sensor data when the wireless tracker has changed location. However, in other embodiments, the management module may request sensor information from sensors at certain time intervals associated or not associated with the location of the wireless tracker.

The wireless tracker 200 may have one or more sensors that include but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, ranging and presence, etc. In one embodiment the sensor may include a location sensor. In another embodiment, the location sensor may be the communication module 210 communicating with a GPS device to retrieve location information of the wireless tracker 200. The management module 212 may be configured to configure the one or more sensors as well as receive sensor information from the one or more sensors. Further, the management module 212 may determine a trigger event based on the location of the wireless tracker device and/or sensor information. In addition, the management module 212 may transmit a notification to a computer server through the communication module based on the trigger event that is forwarded to a user device. Alternatively, sensor information may be provided to a computer server to determine a trigger event or notify the user. Moreover, a trigger event includes, but is not limited to, a shipment exiting shipment origin, delay at an intermediate location, traveling after a delay, temperature deviation, humidity deviation, route deviation, accident to delivery vehicle, tampering and shock to the delivery vehicle. Sensor may include, but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, anti-tampering, ranging and presence, etc.

The authentication module 204 is used to track the chain of custody of the shipment associated with the wireless tracker 200. In one embodiment, a shipper at a shipment origin may enter an authentication code into the authentication module 204. The authentication module 204 verifies the code either locally or transfers the authentication code to a computer server for verification. Once the authentication code is verified, the shipment with the wireless tracker 200 is shipped to the destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 and verified (either locally or at a server). In addition, the verification may include determining whether the wireless tracker 200 is within a distance threshold of the shipment destination in accordance with the shipment order.

The authentication code may or may not be on a package slip. Further, the authentication code may include, but is not limited to, an alphanumeric code (that can be randomly generated), a text code, a graphical code (such as bar code or QR code), and biometric code (such as a fingerprint, signature, retinal scan, iris scan, vein recognition, facial recognition, voice recognition, etc.).

In further embodiments, the management module 212 may determine that the location of the wireless tracker 200 is within a distance threshold of the shipment destination. Further, the management module 212 may determine that a code was received by the authentication module 204 within a time threshold. The distance threshold and time threshold may be parameters for the wireless tracker that are configurable by a shipper or use of the wireless tracker 200. If the code was determined to be received by the authentication module 204 within both the distance threshold and time threshold then the management module 212 may transmit a notification to a computer server through the communication module 210 verifying chain of custody. Such a notification may be sent to a user device. However, if the code was not received by the authentication module 204 either within a distance threshold or within a time threshold then the management module 212 transmit a notification to a computer server through the communication module 210 indicating a break in the chain of custody that is forwarded to a user device.

In other embodiments, the wireless tracker 200 may determine tampering such as separating the wireless tracker from the shipment. Such determination may involve processing sensor information and other parameters such as, but not limited to, ambient light, conductive tape, irregular motion detection, position, loading and orientation of the goods of the shipment.

In further embodiments, the wireless tracker 200 may implement multi-dimensional tracking such as to determine and provide the ability to configure the rules of tracking based on but not limited to if-else-while of various parameter like speed, altitude, temperature, pressure, location, range of cargo from the back door and change the behavior of tracking For example, international tracking intervals is changed while at sea, dynamically changing the tracking geo-boundaries and conditions.

In additional embodiments, the wireless tracker 200 can associated its ID (e.g. RFID) with a shipment order information such as order number, purchase order number, Serial Shipment Container Code (SSCC), Billing of Lading number, Lorry Receipt (LR) number, Shipment Manifest number and others. Also, the wireless tracker is associated with the order information of the shipment in-transit for easy lookup. The wireless tracker may be associated with a wireless tracker identifier (e.g. RFID) such that the wireless tracker identifier is associated with shipment order information. Further, a wireless tracker 200 provides the condition of the shipment in transit such as if the shipment is not within its shipping temperature, humidity, moisture limits, load constraints or if the shipment was moved from one transport carrier to another, or the shipment was not handled properly.

The RFID tag 208 is used to uniquely identify the wireless tracker 300. Thus, when the RFID tag is read at the shipment origin, the RFID tag is stored by the computer server and associated with the shipment. The RFID tag 208 may be read again at the shipment destination to verify the RFID tag is the same as the one read at the shipment origin. The presence of RFID tag allows the wireless tracker owner to check in wireless tracker devices received after use or check out wireless tracker devices to customers for use with ease. It also provides real time inventory reconciliation and verification of device inventory at each wireless tracker device storage location.

Figure 3:
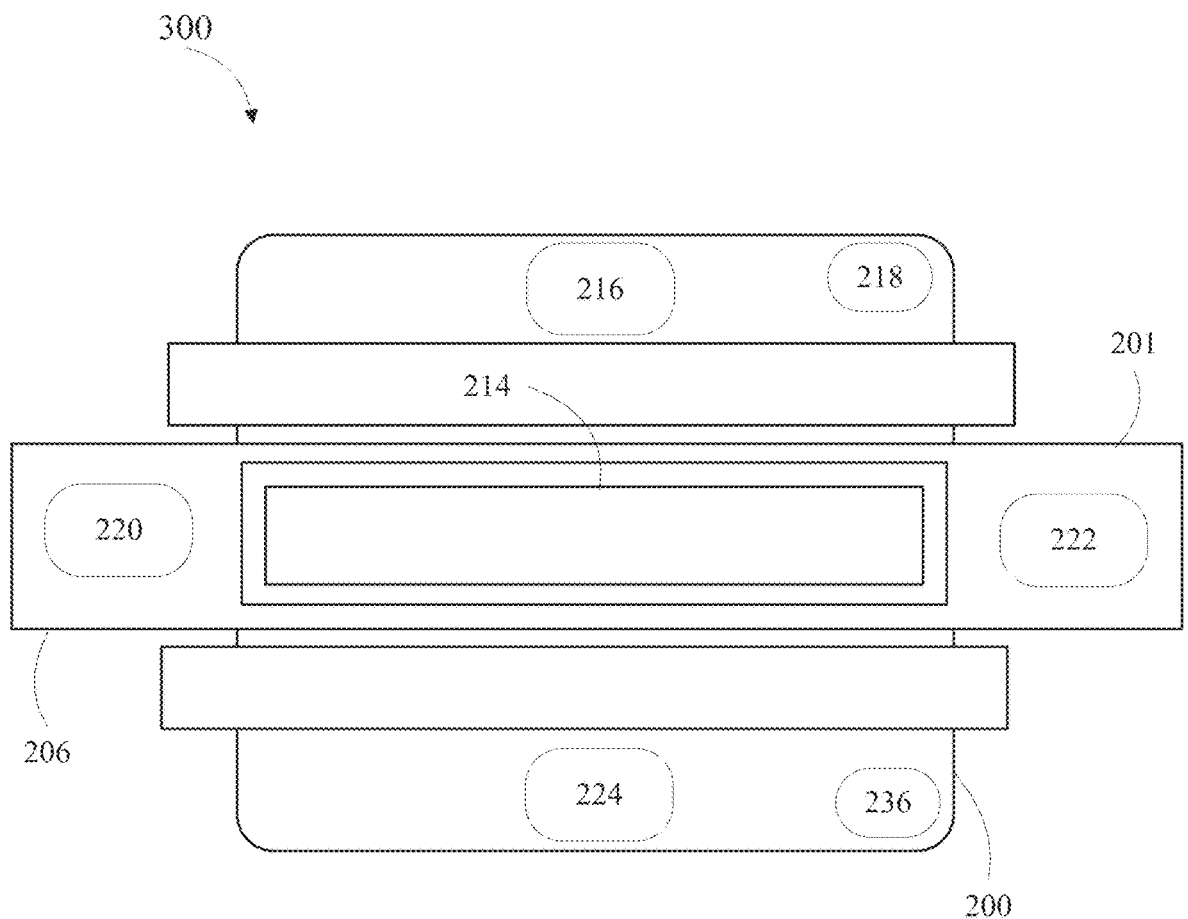

Referring to FIG. 3, a side of the wireless tracker 200 may have one or more panels (216-226) as well as a foam pad 214. The foam pad 214 may be used to cushion or otherwise reduce vibration impacting the wireless tracker 200.

Figure 4:
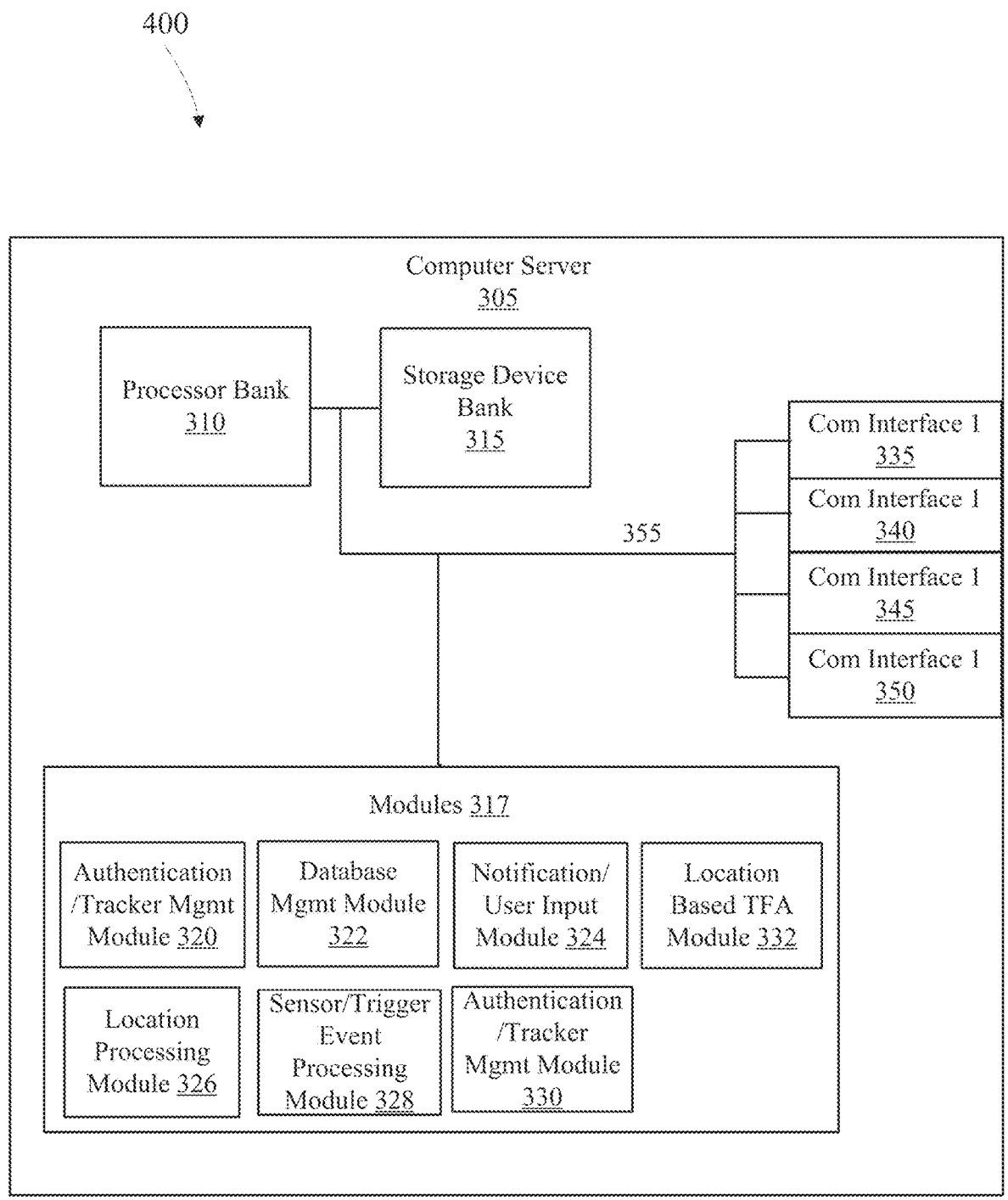
FIG. 4 depicts a functional block diagram of a server system used in location based two-factor authentication delivery tokens, in accordance with some embodiments.

FIG. 4 is functional block diagram of a computer server used in tracking a shipment using a wireless tracker, in accordance with some embodiments. Such a server 305 may be used in a system shown in FIG. 1. The computer server 305 may include several different components such as a processor bank 310, storage device bank 315, one or more software applications, which may be executed by a processor. Thus, the combination of the software applications as well as the processor and any other hardware form specifically-configured modules 317. The computer server 305 also has one or more communication interfaces (335-350). The processor bank 310 may include one or more processors that may be co-located with each other or may be located in different parts of the computer server 305. The storage device bank 315 may include one or more storage devices. Types of storage devices may include electronic memory, optical memory, and removable storage media. The one or more modules 317 may include, but are not limited to, authentication/tracker management module 320, database management module 322, notification/user input module 324, location processing module 326, sensor/trigger event processing module 328, and control module 330. The modules 317 may be implemented by the one or more processors in the processor bank 310. The computer server 305 and any other server described in the present disclosure may include a database stored in a storage device bank or may be coupled to a database. Further, such a computer server may be part of a computer server system described herein that may include one or more computer servers and one or more databases. In the present disclosure, a computer server may, but not always, refer to embodiments that include a computer server system having one or more computer servers and one or more databases coupled to each other. The one or more computer servers may be co-located with each other or distributed among different locations. Likewise, the one or more one or more databases may be co-located with each other or distributed among different locations. In further embodiments, some of the one or more computer servers may be co-located and coupled to the one or more databases while in additional embodiments some of the one or more computer servers may be coupled to the one or more databases each of which are placed in different location. In still further embodiments, a computer server system may refer to at least one of a computer server and a database. The components shown in FIG. 3 may be located in one computer server or be distributed among more than one computer server and/or databases.

The authentication/tracker management module 320 may perform, in some embodiments, the functions of the authentication module 204 and/or the management module 212 of a wireless tracker described herein. Thus, the authentication/tracker management module 320 may be used in tracking the chain of custody of the shipment associated with a wireless tracker. In one embodiment, a shipper at a shipment origin may enter an authentication code into the authentication module of the wireless tracker. Further, the wireless tracker (via its communication module) may transmit the authentication code to computer server 305. The authentication/tracker management module 320 verifies the authentication code and may provide the wireless tracker and/or a user device with a notification that the authentication code has been verified. Once, the authentication code is verified, the shipment with the wireless tracker is shipped to a shipment destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 of the wireless tracker. Further, the wireless tracker (via its communication module) may transmit the authentication code to computer server 305. The authentication/tracker management module 320 verifies the authentication code received at the shipment destination. Further, a notification may be sent to the wireless tracker or the user device that the chain of custody of the shipment has been verified.

The location processing module 326 may determine the location of the shipment based on one or more current locations received from the wireless tracker. Further, the location processing module 326 may access a Global Positioning System (GPS) information (e.g. map information) as well as geo-zone information surrounding one or more shipment locations (i.e. shipment origin, shipment destination, intermediate shipment locations). The location processing module 326 may process such information to determine one or more trigger events. Such trigger events may use the location processing module 326 to communicate with the notification/user input module 324 to send a notification based on the trigger event to a user device. In addition, once a location is determined by the location processing module 326, such location and associated location information may be provided to the authentication/tracker management module for further processing or the notification/user input module 324 to send a notification to the user device. For example, the location processing module 326 may receive a location of the shipment from the wireless tracker that indicates that the shipment is at the shipment origin. Further, the location processing module 326 has access to information that there is geo-zone surrounding the shipment origin. Subsequently, the location processing module 326 may receive a location of the shipment from the wireless tracker that indicates that the shipment has exited the geo-zone surrounding the shipment origin. The location processing module 326 determines that such an event is a trigger event and thereby communicates with the notification/user input module 324 to send a notification to the user device that the shipment has left the shipment origin.

In further embodiments, the authentication/tracker management module 320 may receive the location of the wireless tracker from the location processing module 326 and may determine that the location of the wireless tracker is within a distance threshold of the shipment destination. Further, the authentication/tracker management module 320 may determine that a code was received by the authentication/tracker management module 320 within a time threshold. The distance threshold and time threshold may be parameters that are configurable by a shipper or user of the wireless tracker. If the code was determined to be received and verified by the authentication/tracker management module 320 within both the distance threshold and time threshold then the authentication/tracker management 320 may transmit a notification (via the notification/user input module 324) to the user device verifying chain of custody. However, if the code was not received by the authentication/tracker management module 320 either within a distance threshold or within a time threshold then the authentication/tracker management module 320 transmit a notification (via the notification/user input module 324) to the user device indicating a break in the chain of custody.

In some embodiments, the authentication/tracker management module 320 is configured to determine a current location of the wireless tracker device at one or more intervals wherein the one or more intervals are based on a delivery route of the shipment. For example, the authentication/tracker management module 320 may configure the wireless tracker to determine its location frequently within a distance threshold of the shipment origin or shipment destination. However, the authentication/tracker management module 320 may configure the wireless tracker to determine its location infrequently beyond the distance threshold of the shipment origin and prior to the distance threshold of the shipment destination. Although such a configuration manages battery life of the wireless tracker, such a configuration also avoids a situation when a user defines an alert condition when an asset associated with the wireless tracker enters and exits a specified geographic boundary that may not have been provided if the update interval was simply 30 minutes.

In such a scenario, if the asset enters and exits the specified geographic boundary within 30 minutes then the tracing device fails to provide an update.

In other embodiments, the wireless tracker provides an update regarding remaining battery life of the wireless tracker to the computer server 305. Further, the remaining battery life may be forwarded to a user device by the notification/user input module 324. The authentication/tracker management module 320 may determine to adjust (automatically or based on user input in response to the notification of remaining battery life) the frequency of location and sensor updates of the wireless tracker to better manage the remaining battery life and provides such configuration information to the wireless tracker, accordingly. Further based on a route of the wireless tracker (the route may be preprogrammed into the computer server 305 or determined by the computer server 305 based on one or more location updates provided by the wireless tracker), may provide configuration information to regulate the battery life of the wireless tracker. In additional embodiments, the computer server 305 may receive and process one or more location updates from the wireless tracker to determine a route deviation of the wireless tracker. The computer server may provide additional configuration information to further regulate the battery life based on the route deviation.

In further embodiments, the computer server 305 may receive the current location of the wireless tracker and the location processing module 326 determines that the current location of the wireless tracker is a shipment destination.

In additional embodiments, the computer server 305 may determine tampering of the wireless tracker such as separating the wireless tracker from the shipment. Such determination may involve processing sensor information and other parameters such as, but not limited to, ambient light, conductive tape, irregular motion detection, and orientation of the goods of the shipment.

In further embodiments, the computer server 305 may implement multi-dimensional tracking of the wireless tracker such as to determine and provide the ability to configure the rules of tracking based on but not limited to if-else-while of various parameter like speed, altitude, temperature, pressure, location and change the behavior of tracking For example, international tracking intervals is changed while at sea, dynamically changing the tracking geo-boundaries and conditions.

In additional embodiments, the wireless tracker can associated its ID (e.g. RFID) with a shipment order information such as order number, purchase order number, Serial Shipment Container Code (SSCC), Billing of Lading number, Lorry Receipt (LR) number, Shipment Manifest number and others, and provides such information to the computer server for further processing and notification to the user. Also, the wireless tracker is associated with the order information of the shipment in-transit for easy lookup. Further, a wireless tracker provides to the computer server 305 the condition of the shipment in transit such as if the shipment is not within its shipping temperature, humidity, moisture limits, or if the shipment was moved from one transport carrier to another, or the shipment was not handled properly such that the computer server notifies or takes action on such information.

The database management module 322 manages the storage and access of information related to the operation of the wireless tracker or shipment information. For example, the database management module 322 may store one or more locations of the shipment that is provided by a wireless tracker. In addition, the database management module 322 may store information from one or more sensors coupled to and provided by the wireless tracker. Such location information and sensor information may be used to determine a trigger event to notify the shipper.

The notification/user input module 324 may perform several different functions. One such function may be to receive user input from a user device. Such user input may be configuration parameters for operating the wireless tracker. These may include specified times or locations to query the wireless tracker for sensor information, location, or other status information. Another function of the notification/user input module 424 to provide a notification based on a trigger event to the user device. A notification may be generated based on a trigger event determined by the different modules of the computer server 305 such as, but not limited to, the authentication/tracker management module 320, location processing module 326, and the sensor/trigger event processing module 328.

The sensor/trigger event processing module 328 may receive sensor information from the wireless tracker. Further, the sensor/trigger event processing module may determine certain trigger events based on the received sensor information and send a notification (via the notification/user input module 324) to a user device. In addition, the sensor/trigger event processing module may be programmed to receive configuration parameters to be forwarded to the wireless tracker for its operation. For example, the configuration parameters may include time and location of providing location and other sensor information as well as at which time periods to operate the different sensors to regulate battery life.

In some embodiments, the computer server 305 may receive a notification from the wireless tracker. Further, the computer server 305 may process the information in the notification based on configuration parameters and transmit information to the wireless tracker to take some further action. For example, a user may be tracking a shipment traveling from Las Vegas to Washington, D.C. (by air transport) with an intermediate stop in Dallas during the winter season. However, the computer server 305 may receive a notification that the shipment was diverted to have an intermediate stop at Chicago instead of Dallas due to severe weather conditions surrounding the Dallas area. The computer server 305 may have configuration information that includes that the shipment may be temperature sensitive and cannot be in environment less than 32 degrees Fahrenheit. Further, the computer server may have additional configuration information that if the shipment is at a location above a certain latitude or in a certain geographical area, to request the wireless tracker take a temperature reading with its temperature sensor and provide such temperature sensor information to the computer server 305. Further, if the computer server 305 is notified that the temperature is less than 32 degrees Fahrenheit, then the computer server may send a notification to shipper personnel to place the shipment in a warmer environment.

The control module 330 includes software and hardware functions that assist in performing certain tasks for the computer server 305 such as providing access to a communication link (e.g. wired, wireless, Bluetooth, infra-red, RF, etc.), executing an operating system, managing software drivers for peripheral components, and processing information. In addition, the control module 330 may also include software drivers for peripheral components, user interface computer programs, debugging and troubleshooting software tools. Also, the control module 330 may include an operating system. Such operating systems are known in the art for computer server 305 but may also include computer operating systems (e.g. Windows, Linux, UNIX, and MacOS, etc.).

The location based two factor authentication module 332 includes software and hardware functions that assist in performing certain tasks for the computer server 305 such as determining whether a recipient mobile device authorized to accept receipt of the asset and determining whether a recipient mobile device holder is authorized to accept receipt of the asset. The authorized recipient mobile device being stored associated to a phone number in module 332. Also, the module may receive location data to determine if the location of the asset is within a defined delivery location and determine if the authorized recipient mobile device is within the defined delivery location. The defined origin and delivery destination regions being stored in module 332. The module may provide sending a passcode to the authorized recipient mobile device if the authorized recipient mobile device location and the location of the asset are within the defined delivery location and receiving an authenticated passcode from the authorized recipient mobile device within the defined delivery location. Module 332 may also notify a delivery agent that delivery of the asset is approved. In another embodiment the two factor authentication module may communicate to the authorized recipient an estimated time of arrival of the asset to the delivery destination region.

Each of the communication interfaces (335-350) may be software or hardware associated in communicating to other devices. The communication interfaces (335-350) may be of different types that include a user interface, USB, Ethernet, WiFi, WiMax, wireless, optical, cellular, or any other communication interface coupled to a communication network. One or more of the communication interfaces (335-350) may be coupled to a user interface known in the art.

An intra-device communication link 355 between the processor bank 310, storage device bank 315, modules 317, and communication interfaces (335-350) may be one of several types that include a bus or other communication mechanism.

Figure 5:
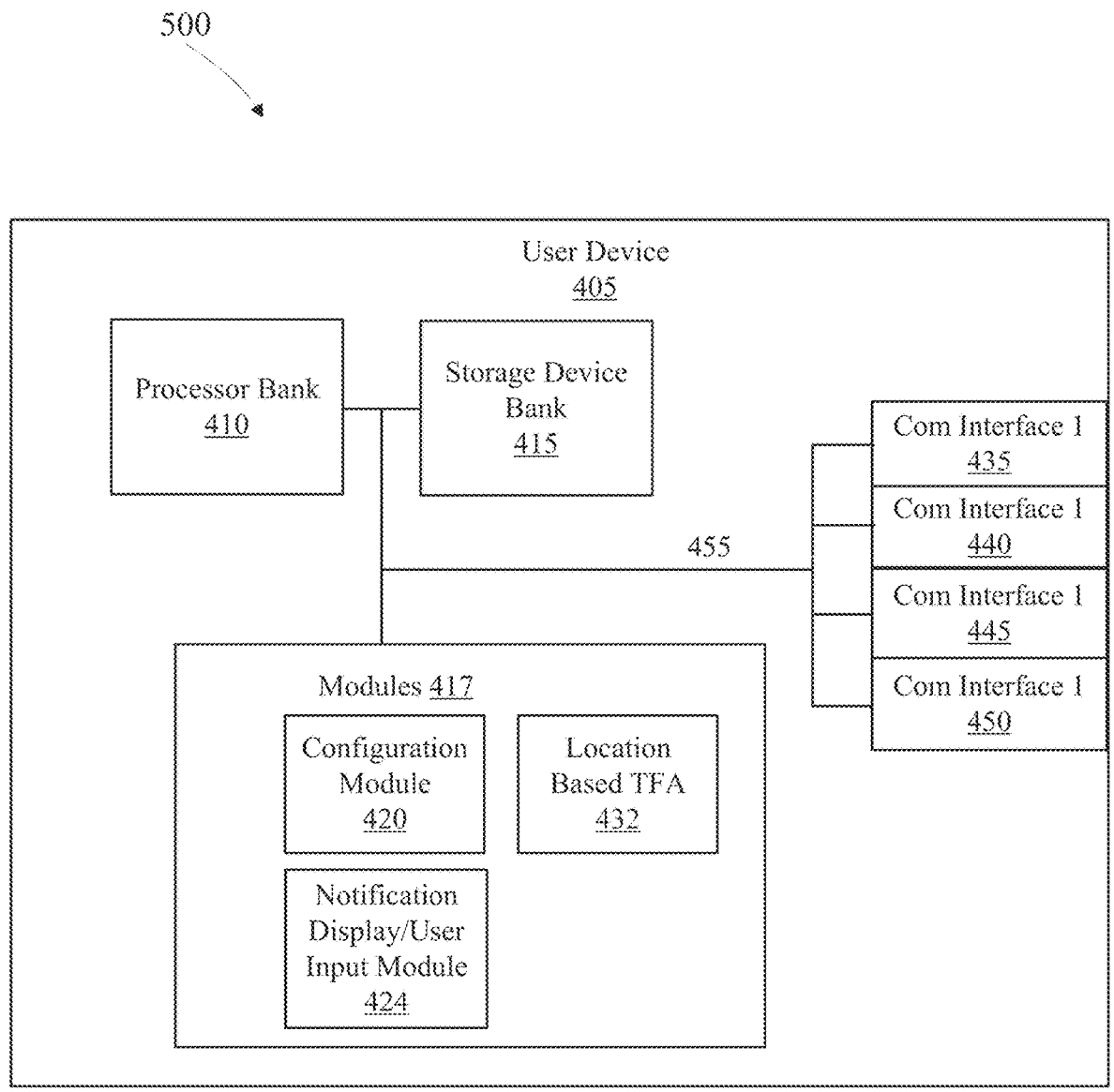
FIG. 5 depicts a functional block diagram a device used in location based two-factor authentication delivery tokens, in accordance with some embodiments.

FIG. 5 is functional block diagram of a user computing device 405 for providing configuration information to a wireless tracker as well as receiving trigger event notifications based on wireless tracker information, in accordance with some embodiments. Such a user device 405 may be used in a system shown in FIG. 1. The user device 405 may include several different components such as a processor bank 410, storage device bank 415, one or more software applications, which may be executed by a processor. Thus, the combination of the software applications as well as the processor and any other hardware form specifically-configured modules 417. The user device 405 also has one or more communication interfaces (435-450). The processor bank 410 may include one or more processors that may be co-located with each other or may be located in different parts of the shipper computing device 405. The storage device bank 415 may include one or more storage devices. Types of storage devices may include electronic memory, optical memory, and removable storage media. The one or more modules 417 may include, but are not limited to, a configuration module 420 and a notification display/user input module 424. The modules 417 may be implemented by the one or more processors in the processor bank 410. Examples of user devices, include, but are not limited to, desktop computers, laptop computers, tablet computers, smartphones, and any other computing devices.

A user may provide configuration information for a wireless tracker. Such user input may be entered into a user interface (one or of the communication interfaces (435-450)) and may be received by the notification display/user input module 424. Such configuration information may include time and location of providing location and other sensor information of the wireless tracker as well as at which time periods to operate the different sensors of the wireless tracker to regulate its battery life. The configuration module 420 may process such configuration information and determine whether such user input may conflict with current operation of the wireless tracker or with a prior configuration of the wireless tracker. If so, the configuration module may provide a notification on the notification display 424. If not, the configuration information may then be transmitted to one or more computer servers over one of the communication interfaces (435-450). Also, the notification display/user input module 424 may receive a notification from the computer server(s) via the communication interface (435-450) and display such a notification on a user interface.

In some embodiments, the user device 405 may receive a notification from the wireless tracker (via a computer server) and present the notification to a user on a user device display. Further, the user may enter information into a user device user interface that may be transmitted to the wireless tracker (via the computer server) to take some further action. For example, a user may be tracking a shipment traveling from Las Vegas to Washington, D.C. (by air transport) with an intermediate stop in Dallas during the winter season. However, the user device 405 may receive a notification that the shipment was diverted to have an intermediate stop at Chicago instead of Dallas due to severe weather conditions surrounding the Dallas area. The shipment may be temperature sensitive and cannot be in environment less than 32 degrees Fahrenheit. The user may input information that is transmitted to the wireless tracker (via the computer server) to request the wireless tracker take a temperature reading with its temperature sensor and provide such temperature sensor information to the user device (via the computer server). Further, if the user is notified that the temperature is less than 32 degrees Fahrenheit, then the user may enter information to the computer server to notify shipper personnel to place the shipment in a warmer environment.

Each of the communication interfaces (435-450) may be software or hardware associated in communicating to other devices. The communication interfaces (435-450) may be of different types that include a user interface, USB, Ethernet, WiFi, WiMax, wireless, optical, cellular, or any other communication interface coupled to a communication network. One or more of the communication interfaces (435-450) may be coupled to a user interface known in the art.

The location based two-factor authentication module 432 includes software and hardware functions that assist in performing certain tasks for the computer server 305 such as locating the position of the authorized recipient mobile device and whether the authorized recipient mobile device detects the wireless tracker signal emitted from the asset to determine a proximity between the wireless tracker an the authorized recipient mobile device.

An intra-device communication link 455 between the processor bank 410, storage device bank 415, modules 417, and communication interfaces (435-450) may be one of several types that include a bus or other communication mechanism.

Figure 6:
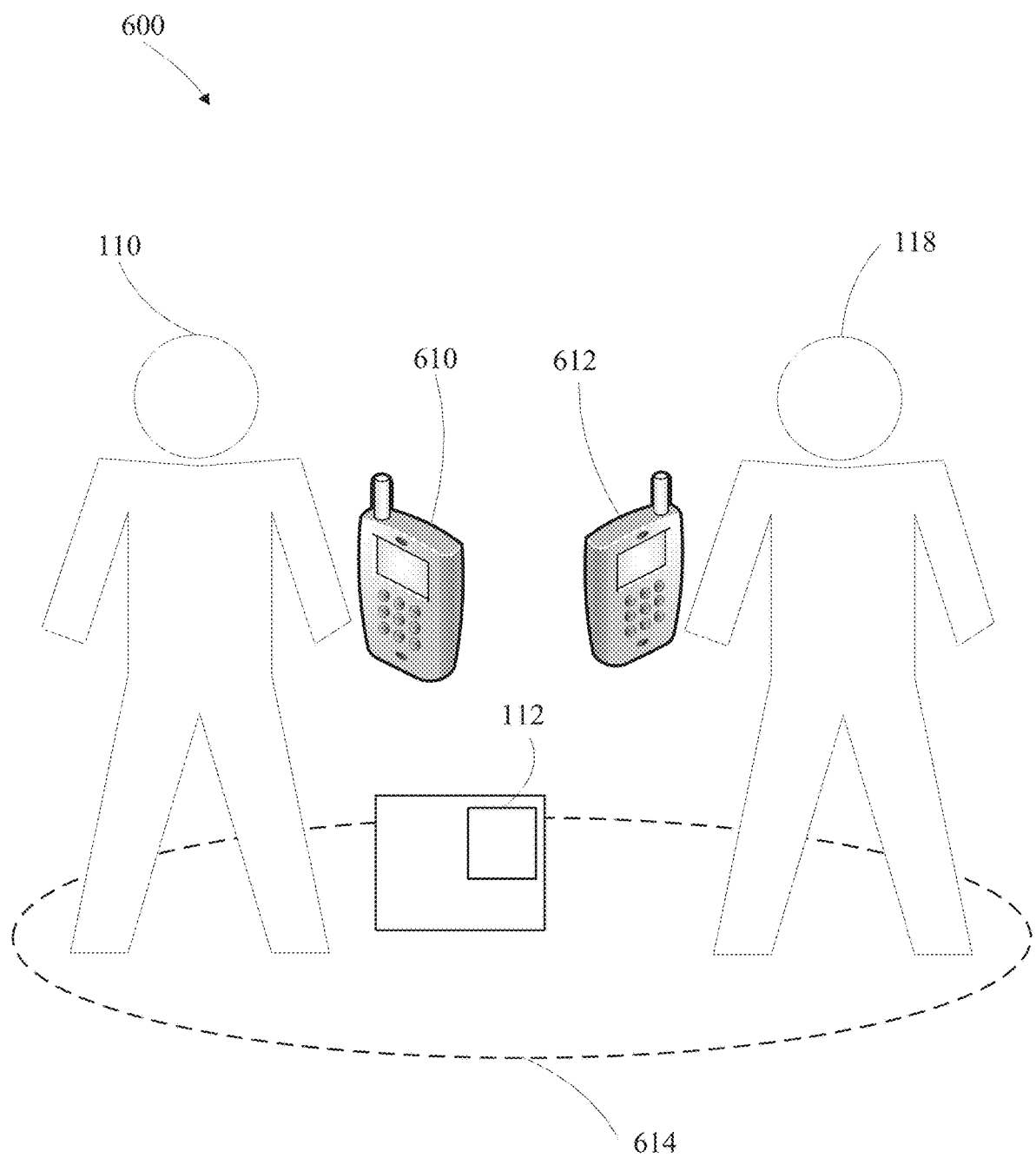
FIG. 6 is a diagram of location based two-factor authentication delivery tokens, in accordance with some embodiments.

FIG. 6 depicts an example in which a delivery agent 110 has an asset having a wireless tracker 112. The delivery agent 110 also has a mobile device 610. An authorized recipient 118 has a mobile device 612. Both the asset with the wireless tracker 112 and the authorized recipient mobile device 612 are both within the destination region 614. A delivery agent has a mobile device with an application that is sending its location, the application performs a similar function to a wireless tracker that transmits location information to a cell tower.

When the device/application comes in proximity with a wireless tracker associated with a recipient or with a mobile device with the same application controlled by the authorized recipient (i.e. when these devices are proximate to each other) and a package is as well, at a designated delivery location, a server sends a one-time ID to the device of the recipient (as a text for ex) and the recipient then types it into the application resident on the mobile device which verifies with the server and then completes the delivery. The recipient may acknowledge receipt by reply to the text or via a biometric acknowledgement, such as a fingerprint scan, iris scan, vein scan, facial scan, voice recognition and the like. The method performs the function of proving delivery of sensitive documents or products such as pharmaceuticals and the like. Other than a text with an acknowledgement, biometric verification may be used as well.

In other embodiments the wireless tracker may be a transceiver or a Bluetooth low energy beacon. The wireless tracker has GSM, WiFi and BLE and acts more like a gateway so it can send data to the cloud. The beacon is BLE and can be read by the wireless tracker or a mobile phone. The beacon cannot send data directly to the cloud server. The location can be restricted based on the ability to manage the accuracy of location services. GPS has an accuracy of about 10 meters in most cases while indoor positioning can be used such as WiFi. Ideally delivery would be restricted to a room within a building or a particular zone such as a loading/unloading zone. The wireless tracker utilizes GPS, Cell Tower and WiFi may also be utilized for determining positioning. Positioning may also be determined by the signal strength of the BLE.

Superusers may be authorized users who can receive packages. This is added by the super user or an administrator. Multiple authorized users may be utilized as a recipient for a company—each authorized will however be allocated their own credentials for security.

A timeout feature where we will ask for a resend of the code if no response is received within a configurable period of time.

Proximity to a beacon may also trigger a geo fence acceptance and generate a code. A passcode confirmation will first be sent to the primary recipient on the delivery paperwork. If the primary recipient is not available another authorized recipient may be recommended by the system. The recipient phone number is recorded, as the phone number is the authorization instrument. So even if the recipient changes phones the number stays with the recipient.

Figure 7:
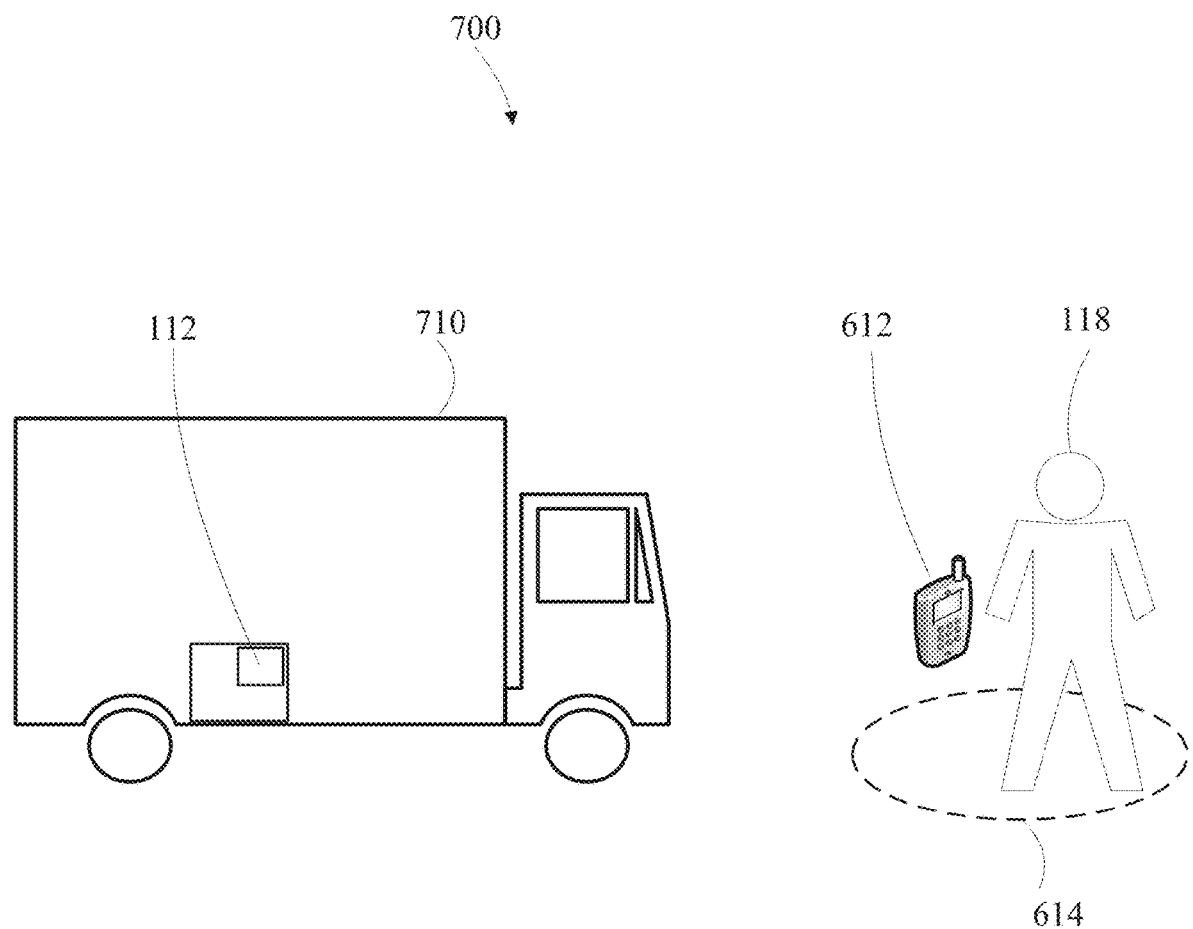
FIG. 7 is a diagram of location based two-factor authentication delivery tokens, in accordance with some embodiments.

FIG. 7 depicts a truck 710 carrying the asset having the affixed wireless tracker 112. As the location of the asset approaches the destination region 614, the authorized recipient 118 receives an estimated time of arrival on the authorized recipient mobile device 612.

Figure 8:
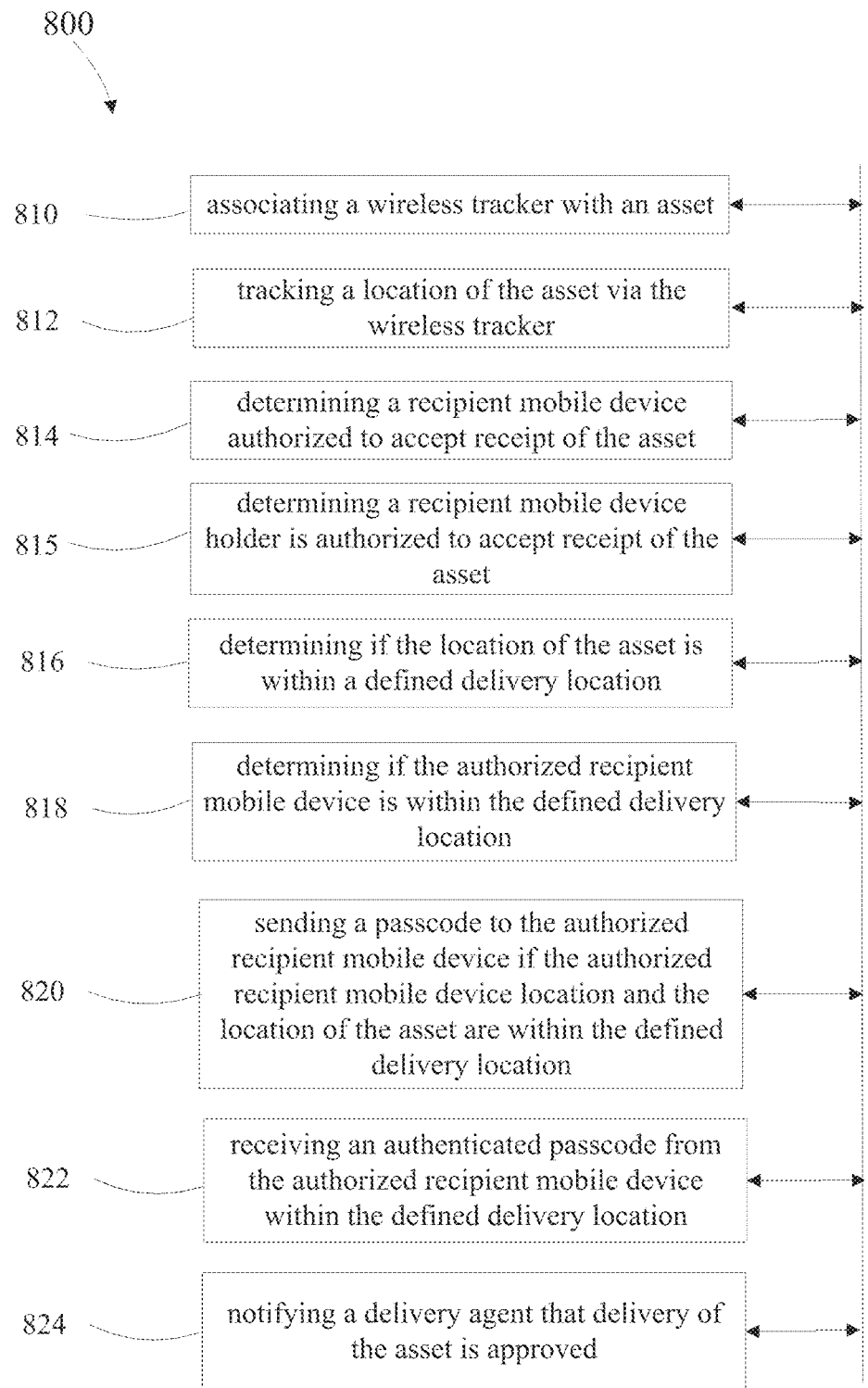
FIG. 8 is a flowchart that illustrates an example method of location based two-factor authentication delivery tokens, in accordance with some embodiments.

Referring to FIG. 8, an example method 800 includes associating 810 a wireless tracker with an asset and tracking 812 a location of the asset via the wireless tracker. The method further includes determining 814 a recipient mobile device authorized to accept receipt of the asset, determining 815 that a recipient mobile device holder is authorized to accept receipt of the asset, determining 816 if the location of the asset is within a defined delivery location and determining 818 if the authorized recipient mobile device is within the defined delivery location. The method also includes sending 820 a passcode to the authorized recipient mobile device if the authorized recipient mobile device location and the location of the asset are within the defined delivery location, receiving 822 an authenticated passcode from the authorized recipient mobile device within the defined delivery location and notifying 824 a delivery agent that delivery of the asset is approved.

Persons of ordinary skill in the art understand that the steps of methods described herein can be implemented in any order and not limited to the order discussed in the present disclosure. Further, functions implemented by modules within the computer server(s) described herein may also be implemented in the modules of the wireless tracker. In addition, functions implemented by the module of the wireless tracker may also be implemented by the computer server(s). Moreover, functions implemented by modules within the computer server(s) described herein may also be implemented in the modules of the user device. Also, functions implemented by modules within the user device described herein may also be implemented in the modules of the computer server(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Additionally, the terms user device and mobile device called out within this document refer to a mobile device which the user utilizes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   identifying, by a server device, a location and status condition of an asset based on sensor information received from a wireless tracker at a same location as the asset;
   identifying, by the server device, a delivery criterion that both the asset and an authorized mobile device are located within a defined delivery location based on the location and status condition;
   sending, by the server device, a passcode to the authorized mobile device based on the identifying the delivery criterion;
   receiving, by the server device, the passcode from the authorized mobile device indicating that the authorized recipient mobile device is in the defined delivery location; and
   notifying, by the server device, a delivery agent that delivery of the asset is approved based on the passcode.

2. The method of claim 1, wherein the identifying the location of the asset comprises at least one of:
   identifying the location of the asset via a global positioning system (GPS),
   identifying the location of the asset via a radio frequency (RF) signal received by a cell tower,
   identifying the location of the asset via WiFi,
   identifying the location of the asset via a mobile device receiving a signal from a cell tower,
   identifying the location of the asset via a mobile device receiving a signal via WiFi, and
   identifying the location of the asset via a reverse image search.

3. The method of claim 1, further comprising:
   timing out the passcode if the passcode is not authenticated within a predetermined interval by the authorized mobile device.

4. The method of claim 1, wherein the identifying that the mobile device is the authorized mobile device further comprises:
   receiving at least one of an input of an unlock code for the recipient mobile device, a retinal scan, an iris scan, a fingerprint scan, a vein scan, a voice print analysis, and a facial recognition scan.

5. The method of claim 1, further comprising:
   saving a proof of delivery.

6. The method of claim 5, wherein the proof of delivery includes an asset delivery time, an asset delivery location, the authorized recipient mobile device, and a passcode confirmation.

7. The method of claim 1, further comprising:
   determining that the location of the asset is within a predetermined distance of the defined delivery location; and
   notifying the authorized mobile device of an estimated time of arrival of the asset.

8. The method of claim 1, further comprising:
   requesting a confirmation of an authentication of the authorized mobile device; and
   receiving indication that the authorized mobile device is authenticated.

9. The method of claim 1, further comprising:
   sending a proof of delivery to a second mobile device.

10. The method of claim 1, further comprising:
    registering users to a pool of mobile devices pre-approved to receive the asset;
    associating a primary mobile device, of the pool of pre-approved mobile devices, with the wireless tracker; and
    sending the passcode to the primary mobile device.

11. The method of claim 1, further comprising:
    receiving a digital photo of the asset at the defined delivery location; and
    receiving a digital photo of the recipient at the defined delivery location.

12. The method of claim 1, further comprising:
    checking the location of the asset in response to transmissions of the wireless tracker.

13. A server device, comprising:
    a memory storing instructions; and
    a processor that when executing the instructions is configured to:
       identify a location and status condition of an asset based on sensor information received from a wireless tracker at a same location as the asset;
       identify a delivery criterion that both the asset and an authorized mobile device are located within a defined delivery location based on the location and status condition;
       send a passcode to the authorized mobile device based on the identification of the delivery criterion;
       receive the passcode from the authorized mobile device indicating that the authorized recipient mobile device is in the defined delivery location; and
       notify a delivery agent that delivery of the asset is approved based on the passcode.

14. The server device of claim 13, wherein the processor is further configured to:
    register users to a pool of recipient mobile devices pre-approved to receive the asset;
    associate a primary mobile device of the pool of pre-approved mobile devices; and
    send the passcode to the mobile device.

15. The server device of claim 13, wherein the processor is further configured to:
    determine that the location of the asset is within a predetermined distance of the defined delivery location; and
    notify the mobile device of an estimated time of arrival of the asset.

16. The server device of claim 13, wherein the cloud based system:
  requests confirmation of authentication of the authorized recipient mobile device; and
  receives indication that the authorized recipient mobile device is authenticated.

17. The server device of claim 13, wherein, when the processor is configured to identifying that the mobile device is the authorized mobile device, the processor is further configured to:
  receive at least one of an input of an unlock code for the recipient mobile device, a retinal scan, an iris scan, a fingerprint scan, a vein scan, a voice print analysis, and a facial recognition scan.

18. The server device of claim 13, wherein the processor is further configured to:
  send a proof of delivery to the authorized recipient mobile device and a second mobile device, wherein the proof of delivery includes an asset delivery time, an asset delivery location, the authorized recipient, and a passcode confirmation.

19. The server device of claim 13, wherein the processor is further configured to:
  receive a digital photo of the asset at the defined delivery location; and
  receive a digital photo of the recipient at the defined delivery location.

20. A non-transitory computer readable medium comprising instructions that when executed by a processor causes the processor to perform:
  identifying, by a server device, a location and status condition of an asset based on sensor information received from a wireless tracker at a same location as the asset;
  identifying, by the server device, a delivery criterion that both the asset and an authorized mobile device are located within a defined delivery location based on the location and status condition;
  sending, by the server device, a passcode to the authorized mobile device based on the identifying the delivery criterion;
  receiving, by the server device, the passcode from the authorized mobile device indicating that the authorized recipient mobile device is in the defined delivery location; and
  notifying, by the server device, a delivery agent that delivery of the asset is approved based on the passcode.

* * * * *